United States Patent [19]

Yanagihara et al.

[11] Patent Number: 4,996,682
[45] Date of Patent: Feb. 26, 1991

[54] OPTICAL INFORMATION MEDIUM HAVING PAIRED WOBBLE PITTS WITH CONTINUOUS GROOVE THEREBETWEEN

[75] Inventors: Hitoshi Yanagihara, Kamakura; Nobuhiro Tokushuku, Yokohama, both of Japan

[73] Assignee: Hitachi, Ltd., Tokyo, Japan

[21] Appl. No.: 260,387

[22] Filed: Oct. 20, 1988

[30] Foreign Application Priority Data

Nov. 7, 1987 [JP] Japan ................. 62-280300

[51] Int. Cl.$^5$ .................. G11B 7/24; G11B 7/007
[52] U.S. Cl. ................. 369/275.4; 369/275.1; 369/275.3
[58] Field of Search .......... 369/275.4, 109, 44.13, 369/47, 48, 277, 278, 279, 275.1, 275.3

[56] References Cited

U.S. PATENT DOCUMENTS 4,748,609  5/1988  Yonezawa et al. ............ 369/275
4,779,253 10/1988  Getreuer et al. .............. 369/44
4,807,210  2/1989  Kaku et al. .................. 369/44

Primary Examiner—Stuart S. Levy
Assistant Examiner—Hoa Nguyen
Attorney, Agent, or Firm—Antonelli, Terry, Stout & Kraus

[57] ABSTRACT

The present invention relates to an optical information medium for recording and reproducing information optically. Particularly, it is concerned with a so-called sample servo type optical information medium wherein an optical head traces over the center line of an imaginary track on the basis of information obtained from at least a pair of wobble pits disposed on both sides of the said imaginary track center line. A continuous groove is formed between the paired wobble pits along the imaginary track center line in a certain area of the optical information medium so that the deviation of each wobble pit from the imaginary track center line can be easily grasped and the conditions of the wobble pits being formed can be estimated. The quality of the medium being manufactured can be easily judged by the presence of such continuous groove.

14 Claims, 2 Drawing Sheets

USER AREA
OUT OF USER AREA

OPTICAL INFORMATION MEDIUM HAVING PAIRED WOBBLE PITS WITH CONTINUOUS GROOVE THEREBETWEEN

BACKGROUND OF THE INVENTION

The present invention relates to a sample servo type optical information medium capable of recording and reproducing information optically, the information medium indicating a replica plate or a stamper or master for fabricating a replica plate.

As tracking servo methods adoptable in an optical disc capable of recording and reproducing information there are two methods which are a continuous groove servo method and a sample servo method. The sample servo method is described, for example, in U.S. Pat. No. 4,402,061.

Further, as a patent application relating to sample servo control there has been filed Japanese Patent Application No. 62-42522 (Feb. 27, 1987), which has also been filed in the U.S. and Europe.

The continuous groove servo method has long been developed, while the sample servo method has recently been developed actively because of high tracking stability.

According to the sample servo method, sector address portions and sample mark areas are disposed in places along an imaginary track beforehand on a replica plate of an optical disc. It is necessary that about 30 sector address portions be present on one circle of the imaginary track and 1,000 to 3,000, usually 1,376, sample mark areas present thereon.

And in each sample mark area there are present two sample marks and a clock pit, as a pair, along the center line of the imaginary track.

The sample marks are formed as wobble pits wobbled symmetrically right and left from the center line of the imaginary track. The clock pit is formed so that the center thereof is positioned on the center line of the imaginary track. The sample marks will hereinafter be referred to as wobble pits.

These wobble and clock pits each have a length, t, of 90 nsec on time base. For example, the pit length, t, is 0.5 $\mu$m at a disc radius of 30 mm and a disc revolution of 1,800 rpm. An optical depth of each pit is $\lambda/4$ ($\lambda$ represents the wavelength of laser light used in information recording and playback, usually 830 nm).

For recording or reproducing information using such sample servo type optical disc, laser light is radiated onto the replica plate from a recording/playback head (not shown), then the reflected light is detected and a tracking control is performed for the recording/playback head so that the head occupies a position in which the quantities of reflected lights from the wobble pits are the same. By so doing, the recording/playback head can trace over the center line of the imaginary track passing through the center of the clock pit. And the detection of clock data is effected by detecting the quantity of reflected light from the clock pit.

Of most importance in the sample servo type optical disc is in which positions wobble pits are to be formed. If the positions where wobble pits are formed are not symmetrical right and left with respect to the center line of the imaginary track passing through the center of the clock pit, the wobble pits will become different in size (shape) from each other under the wobble pit forming method available.

That the wobble pits are not in positions symmetrical right and left with respect to the center line of the imaginary track and are different in size (shape) from each other, means that it is impossible to effect an accurate tracking control.

Therefore, during the optical disc fabricating process, it is a very important matter to measure the wobble width (wobble quantity) of each wobble pit, namely, the distance from the center line of the imaginary track to the center of each wobble pit, to estimate the condition of each wobble pit being formed.

In the prior art, however, there are present only pits on the sample servo type optical disc, so for measuring the wobble width of each wobble pit referred to above, there is no other way than measuring it with reference to the clock pit through the center of which the center line of the imaginary track passes. However, since there is a considerable distance between each clock pit and each wobble pit, it is difficult to even judge which clock pit and wobble pit are in a pair. Thus, it has been very difficult to actually measure the wobble width of each wobble pit.

SUMMARY OF THE INVENTION

It is therefore the object of the present invention to solve the above-mentioned problem of the prior art and provide a replica plate or a stamper or master, as an optical information medium, capable of measuring the wobble width (wobble quantity) of each wobble pit and estimating the condition of the wobble pit being formed during a sample servo type optical disc fabricating process.

In the present invention, in order to achieve the above-mentioned object, a groove or a pit serving as a reference line for measuring and estimating the wobble quantity of each wobble pit is formed on and along the center line of an imaginary track in a certain area of a replica plate which constitutes the sample servo type optical disc, or of a stamper or master which is for fabricating the replica plate.

In the prior art, as mentioned above, for measuring the wobble width (wobble quantity) of each wobble pit, there has been no other method than measuring it with reference to a clock pit through the center of which the center line of an imaginary track passes, because there are present only pits on the sample servo type optical disc.

In the present invention, in view of the point just mentioned above, a groove or pit is formed as a reference line for measuring and estimating the wobble quantity of each wobble pit, on and along the center line of an imaginary track in a certain area of the replica plate or of a stamper or master.

By using such groove or pit as a reference line in the sample servo type optical disc fabricating process, the wobble width (wobble quantity) can be measured easily and so it becomes possible to estimate the condition of the wobble pit being formed.

DETAILED DESCRIPTION OF THE PREFERRED EMBODIMENTS

The following description is now provided about an example of application of the present invention to a glass master for fabricating a replica disc in an optical disc according to an embodiment of the present invention.

Figure 1A:
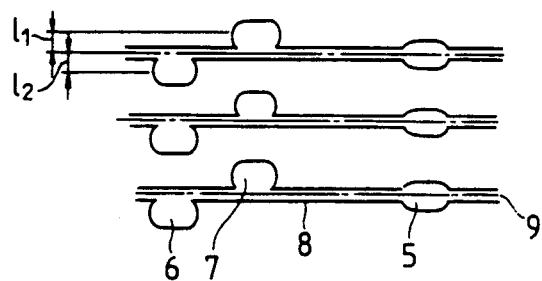
FIGS. 1A and 1B are each a partially enlarged view showing, on a larger scale, a certain area of a glass master according to an embodiment of the present invention.
Figure 1B:
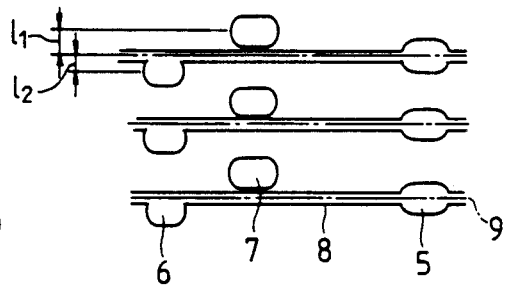

In FIGS. 1A and 1B, which are partially enlarged views showing on a larger scale a certain area of a glass master embodying the invention, the reference numeral 5 denotes a clock pit; numerals 6 and 7 each denote a wobble pit; numeral 8 denotes a continuous groove; and numeral 9 represents the center line of an imaginary track. The difference between FIGS. 1A and 1B will be explained later.

According to this embodiment, in a glass plate for fabricating a replica plate, a continuous groove 8 serving as a reference line for measuring the wobble width (wobble quantity) of the wobble pits 6 and 7 and estimating the condition of the pits being formed, is formed in addition to the wobble pits 6, 7 and clock pit 5 in an area outside the user area of the optical disc, as shown in FIGS. 1A and 1B.

Figure 2:
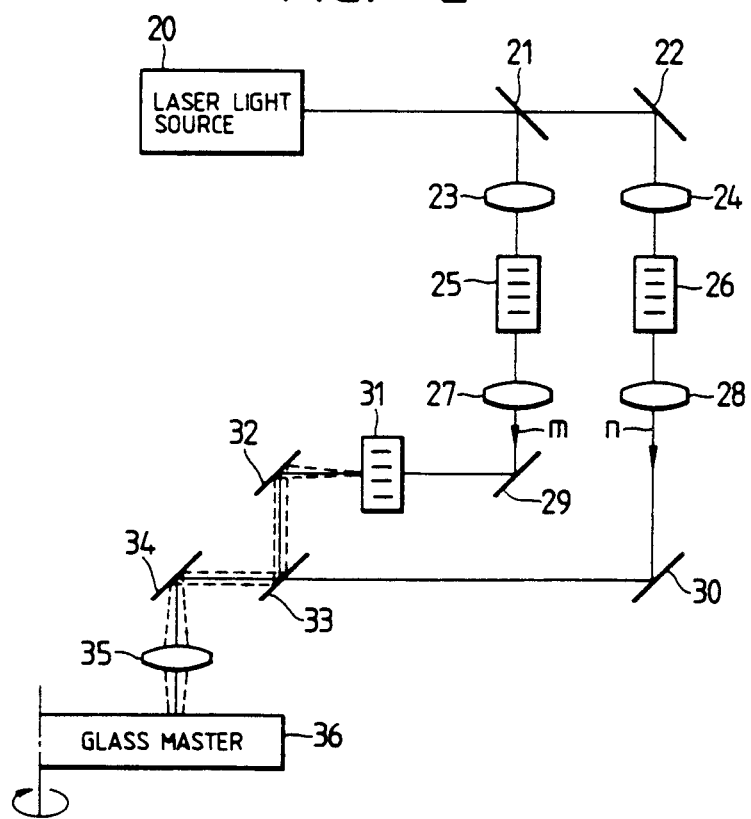
FIG. 2 is a construction diagram schematically showing a laser exposurer for forming a continuous groove or pits, which are illustrated in FIG. 1, on a glass master.

FIG. 2 is a construction diagram schematically showing a laser exposurer for forming the aforesaid continuous groove as well as wobble and clock pits on the glass master. In FIG. 2, the numeral 20 denotes a laser light source; numerals 21 and 33 each denote a half mirror; numerals 22, 29, 30, 32 and 34 each denote a mirror; numerals 23, 24, 27, 28 and 35 each denote a lens; numerals 25 and 26 each denote a signal modulator (hereinafter referred to as "AOM" (Acoustic Optical Modulator)); numeral 31 denotes a beam deflector ("AOD" (Acoustic Optical Deflector) hereinafter); and numeral 36 denotes a glass master, with a resist layer being formed by application onto the glass master 36. AOM's 25, 26 and AOD 31 are each constituted by an acousto-optical element.

As shown in FIG. 2, a laser beam emitted from the laser light source 20 is split into two by the half mirror 21, one of which then passes along an optical path, m, while the other passes along an optical path, n.

The laser beam traveling along the optical path, m, is incident on the AOM 25 through lens 23, where it is modulated according to pits to be formed (wobble and clock pits). More specifically, in a place where a pit is to be formed, the AOM 25 allows the incident laser beam to pass, while in a place where a pit is not to be formed, the AOM 25 shuts off the incident laser beam. Next, the laser beam which has passed through the AOM 25 is incident on the AOD 31 through lens 27 and mirror 29, where deflection of beam is made according to a pit to be formed. More specifically, only in a place where a wobble pit is to be formed, the AOD 31 deflects the incident laser beam in a predetermined direction and does not deflect the beam in a place where a clock pit is to be formed. Thereafter, the laser beam which has passed through the AOD 31 is applied onto the glass master 36 through mirror 32, half mirror 33, mirror 34 and lens 35 to form wobble and clock pits.

On the other hand, the laser beam traveling along the optical path, n, is incident on the AOM 26 through mirror 22 and lens 24. Upon arrival at an area outside the area to serve as the user area, the AOM 26 allows the incident laser beam to pass therethrough continuously. The laser beam thus from the AOM 26 is applied onto the glass master 36 through lens 28, mirror 30, half mirror 33, mirror 34 and lens 35, to form a continuous groove. In this case, adjustment is made in advance so that the radiated position of the laser beam from the AOM 26 is coincident with that of the laser beam from the AOD 31 when the AOD does not perform the deflection of beam. By so doing, a continuous groove is sure to be formed on the center line of an imaginary track passing through the center of a clock pit.

In this way, by using the laser exposurer shown in FIG. 2, wobble pits 6, 7 and a clock pit 5 are formed in the area to serve as the user area on the glass master 36, and outside the area to serve as the user area there is formed such a continuous groove 8 extending along the center line 9 of the imaginary track as shown in FIG. 1.

Since in this embodiment the continuous groove 8 is never fail to be formed on the imaginary track center line 9 as noted above, the wobble width (wobble quantity) of the wobble pits 6 and 7 can be measured easily by using the continuous groove 8 as a reference line.

For example, it is here assumed that the thus-formed wobble pits 6, 7, clock pit 5 and continuous groove 8 are in such a state as shown in FIG. 1A. In this case, by measuring the wobble widths $l_1$ and $l_2$ of the wobble pits 6 and 7 using the continuous groove 8 as a reference line, $l_1$ is found equal to $l_2$ and it is possible to estimate that the forming conditions are appropriate or normal (in other words, the wobble pits 6 and 7 are symmetric right and left with respect to the imaginary track center line 9 and the same in size and shape and contact the continuous groove 8, as shown in the normal condition).

If it is assumed that the thus-formed wobble pits 6, 7, clock pit 5 and continuous groove 8 are in such a state as shown in FIG. 1B then upon measurement the wobble widths of the wobble pits 6 and 7 are found to be in the relation of $l_1 > l_2$ and it is possible to estimate that the forming conditions are not appropriate (in other words, the wobble pits 6, 7 are asymmetrical with respect to the imaginary track center line 9 and different in size and shape and wobble pit 7 does not contact continuous groove 8, as shown). A probable cause is that the adjustment of the AOD 31 shown in FIG. 2 is not sufficient.

Such inconvenience can be remedied by adjusting the AOD 31 correctly so that the wobble widths $l_1$ and $l_2$ of the wobble pits 6 and 7 measured above satisfy the relation of $l_2 = l_2$.

Thus, by forming the continuous groove 8 along the imaginary track center line 9 and using it as a reference line, it is possible to easily measure the wobble widths of the normal or abnormal wobble pits 6 and 7 and estimate the condition of the wobble pits being formed. Further, a paired relation between wobble and clock pits becomes clear.

In FIG. 2, as previously noted, adjustment is made in advance so that the radiated position on the glass master 36 of the laser beam from the AOM 26 is coincident with that of the laser beam from the AOD 31 when the AOD does not perform the beam deflection. If the adjustment should not be made correctly for some reason or other, the continuous groove 8 would be formed somewhat off the imaginary track center line 9 to either the right or the left. However, even if there should be formed such a continuous groove 8, as long as it is formed in parallel with the center line 9, it is possible to measure the wobble widths of the wobble pits 6 and 7 by measuring the deviation between the thus-formed continuous groove 8 and the clock pit 5 through the center of which the center line 9 of the imaginary track passes and by using the continuous groove 8 as a reference line while taking such deviation into consideration.

The following description is now provided about an example of application of the present invention to a replica plate which constitutes a 5.25-inch dia. postscript type optical disc according to another embodiment of the present invention.

Figure 3A:
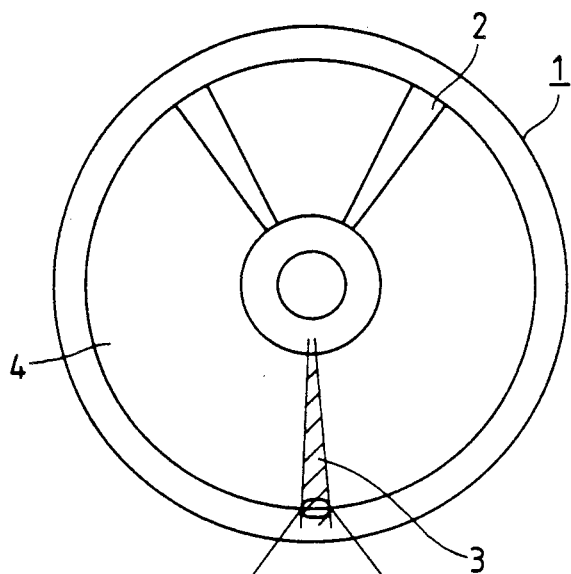
FIGS. 3A and 3B are plan views showing a replica plate according to another embodiment of the present invention.
Figure 3B:
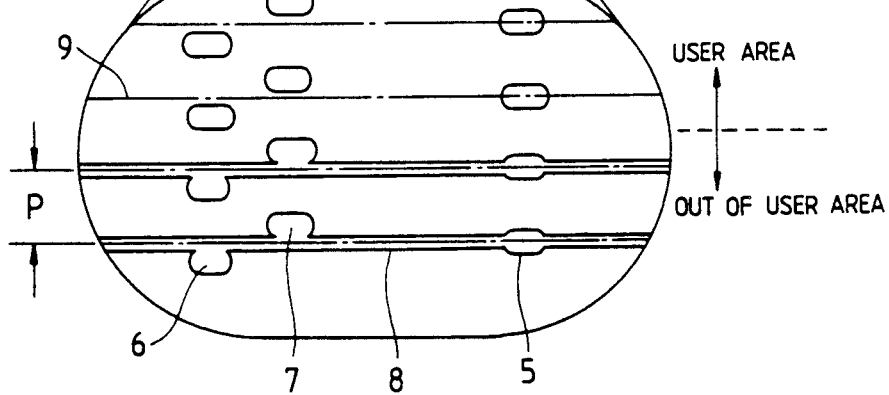

FIG. 3 is a plan view showing a replica plate according to another embodiment of the present invention, in which FIG. 3A schematically shows the whole of the replica plate and FIG. 3B shows a principal portion of the replica plate on a larger scale.

The replica shown in FIG. 3A, indicated at 1, is fabricated by first producing a stamper on the basis of a glass master obtained in such a manner as in the previous embodiment and then injection-molding polycarbonate using the stamper thus fabricated. The replica plate 1 has an inside diameter of 15 mm (in diameter), an outside diameter of 130 mm (in diameter) and a thickness of 1.2 mm.

On the replica plate 1 are formed sector address portions 2 and sample mark areas 3 in places along an imaginary track. The area from a 29 mm position up to a 61 mm position in the disc radius serve as a user area 4.

In the user area 4 of each sample mark area 3 are formed in a pair sample marks 6, 7 and a clock pit 5 along a center line 9 of the imaginary track, as shown in FIG. 3B. Further, in each sample mark area 3 outside the user area 4, a continuous groove 8 serving as a reference line is formed on the imaginary track center line 9 in addition to the sample marks 6, 7 and clock pit 5 with respect to about ten imaginary tracks in the inner and outer peripheral portions of the user area 4.

The wobble pits 6, 7 and clock pit 5 have an optical depth of about $\lambda/4$ ($\lambda$ represents the wavelength of laser beam used in information recording and playback, usually 30 nm). The track pitch, indicated at P, is 1.5 $\mu$m and the pit width is 0.6 $\mu$m. As to the continuous groove 8 serving as a reference line, in order to minimize its interference with other pits, its width and depth are set at about 0.4 $\mu$m and about 300 Å, respectively. The groove depth is not specially limited if only the presence of the groove can be seen through a microscope; a depth of $\lambda/16$ or so is sufficient.

As to the number of the continuous groove to be formed, it may be at least one. However, forming two such grooves is advantageous in that the amount of deviation of wobble pits can be visually seen quantitatively because the spacing between the grooves correspond to the track pitch. Actually, 30 to 35 such grooves are formed. The reason is that thirty such grooves result in a width of approximately 50 $\mu$m because the track pitch is 1.5 $\mu$m and so their presence can barely be recognized visually. In the case of thirty continuous grooves, the time required for cutting is about 5 seconds. The time required for cutting the entire disc is about 60 minutes.

In the outer periphery of each continuous groove is formed at a width of about 1 mm such a double transfer preventing groove as described in the foregoing Japanese Patent Application No. 62-42522.

Thus in this embodiment the continuous groove 8 is formed along the imaginary track center line 9 in addition to wobble pits 6, 7 and clock pit 5 in the area outside the user area on the replica plate 1 and it is used as a reference line, whereby during the manufacturing process the wobble width (wobble quantity) of each of the wobble pits 6 and 7 can be measured and the condition of the wobble pit being formed can be grasped, so it can be easily judged whether the pit is being formed in an appropriate condition or not.

It is preferable that the continuous grooves be formed in either the inner or the outer periphery of the user area. They may be formed in both such inner and outer peripheries. It was experimentally confirmed that the deviation at the inner periphery and that at the outer periphery were equal. From this standpoint, it is sufficient to provide the continuous grooves in either the inner or the outer periphery of the user area. However, where the adjustment of the apparatus is not satisfactory, it is necessary to provide the continuous grooves in both such peripheries.

Although in the above embodiments the present invention was applied to the replica plate constituting the optical disc or to the glass master for fabricating the replica plate, the present invention is also effective in its application to a stamper obtained from the glass master.

Thus, in the present invention, all that is required is to merely form a reference line for measuring and estimating the wobble quantities of wobble pits on the center line of an imaginary track along the center line of the said track in a certain area of a replica plate or of a stamper or a master. The size and shape of such reference line are not specially limited.

For example, in the embodiment illustrated in FIG. 3, even if the width and depth of the continuous groove 8 serving as a reference line are set at about 0.5 $\mu$m and $\lambda/8$, respectively, ($\lambda$ represents the wavelength of laser beam used in information recording and playback, usually 830 nm), there will be obtained a similar effect.

Figure 4:
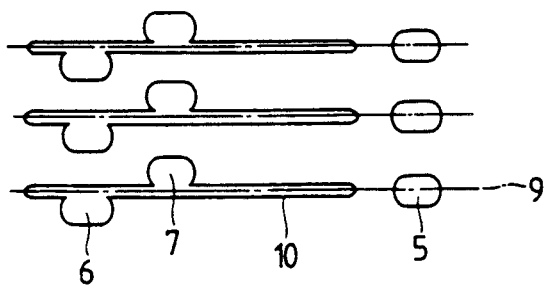
FIG. 4 is an explanatory view shown another concrete example of a reference line formed in the invention.

The reference line may be in such a shape of pit 10 formed along the imaginary track center line 9, as shown in FIG. 4, and it may be formed only in the portions of the wobble pits 6 and 7.

Effect of the Invention

According to the present invention, during the manufacturing process of a sample servo type optical disc it is possible to measure the wobble width (wobble quantity) of each wobble pit and easily estimate the condition of wobble pits being formed, whereby the time required for judging whether the optical disc being manufactured is good or not can be shortened and it is possible to obtain an optical disc of high accuracy.

We claim:

1. In an optical information medium having a clock pit disposed on the center line of an imaginary track and at least a pair of wobble pits disposed on both sides of said imaginary track center line, wherein an optical head traces over the imaginary track center line to record or reproduce information, the improvement characterized in that a continuous groove is formed between said paired wobble pits along said imaginary track center line in a certain area of the optical information medium so that said continuous groove contacts each of said paired wobble pits when said paired wobble pits are properly disposed with respect to said imaginary track center line in a normal condition.

2. An optical information medium according to claim 1, wherein said continuous groove is formed not only between said paired wobble pits along said imaginary track center line but also on said clock pit disposed on the imaginary track center line.

3. An optical information medium according to claim 1, which is in the shape of a disc.

4. An optical information medium according to claim 3, wherein said continuous groove is formed in at least one of the inner and the outer periphery of a user area in said disc.

5. An optical information medium according to claim 3, wherein said continuous groove is formed only in the outer periphery of a user area in said disc.

6. An optical information medium according to claim 1, wherein the width of said continuous groove is smaller than the width of said clock pit and that of each said wobble pit.

7. An optical information medium according to claim 1, wherein said continuous groove has an optical depth larger than $\lambda/16$.

8. An optical information medium according to claim 1, including at least one said continuous groove.

9. An optical information medium according to claim 8, including at least two said continuous grooves.

10. An optical information medium according to claim 1, wherein said certain area of the optical information medium where said continuous groove is formed between said paired wobble pits is an area other than a user area of the optical information medium wherein said paired wobble pits is disposed on both sides of said imaginary track line without a continuous groove therebetween.

11. An optical information medium according to claim 10, wherein said continuous groove has a width narrower than a width of each of said paired wobble pits in the normal condition.

12. An optical information medium according to claim 11, wherein the optical information medium has a shape of a disc.

13. An optical information medium according to claim 12, wherein the optical information medium is provided with first, second and third areas radially arranged on said disc, said second area being said user area and said certain area being at least one of said first and third areas of said disc.

14. An optical information medium according to claim 13, wherein said certain area having said continuous groove is said third area disposed radially outwardly of said user area.

* * * * *